(12) United States Patent
Ko et al.

(10) Patent No.: US 12,405,520 B2
(45) Date of Patent: Sep. 2, 2025

(54) LIGHT SOURCE FIXING ASSEMBLY AND PROJECTION DEVICE

(71) Applicant: Coretronic Corporation, Hsin-Chu (TW)

(72) Inventors: Tung-Yi Ko, Hsin-Chu (TW); Yi-Chou Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 476 days.

(21) Appl. No.: 18/093,337

(22) Filed: Jan. 5, 2023

(65) Prior Publication Data

US 2023/0229067 A1 Jul. 20, 2023

(30) Foreign Application Priority Data

Jan. 20, 2022 (CN) .......................... 202210064619.3

(51) Int. Cl.
*G03B 21/20* (2006.01)
*G03B 21/16* (2006.01)

(52) U.S. Cl.
CPC ............. *G03B 21/20* (2013.01); *G03B 21/16* (2013.01)

(58) Field of Classification Search
CPC ................. G03B 21/00–64; H04N 9/31–3197
See application file for complete search history.

(56) References Cited

U.S. PATENT DOCUMENTS

| 6,342,932 | B1 | 1/2002 | Terao et al. | |
|---|---|---|---|---|
| 2020/0014893 | A1* | 1/2020 | Li | H04N 9/3144 |
| 2020/0089090 | A1* | 3/2020 | Li | G03B 21/16 |
| 2020/0379325 | A1* | 12/2020 | Lee | F21S 41/25 |

FOREIGN PATENT DOCUMENTS

| CN | 201540443 U | 8/2010 |
|---|---|---|
| IN | 109990241 A | 7/2019 |
| TW | 595865 U | 6/2004 |
| TW | M263518 U | 5/2005 |
| TW | M321112 U | 10/2007 |
| TW | I420986 B | 12/2013 |
| TW | 202125912 A | 7/2021 |

* cited by examiner

*Primary Examiner* — Christopher A Lamb, II (57) ABSTRACT

A light source fixing assembly includes an optical engine housing, a circuit board, a light emitting element, a flexible circuit board, a fixing element and an abutting element. The circuit board has a bearing surface, a first fixing region and a first conductive bonding region. The first bonding region and the light emitting element are on the bearing surface. The flexible circuit board is between the optical engine housing and the circuit board. The flexible circuit board has a first surface, a second surface opposite to the first surface, and a second fixing region. The second surface has a second bonding region. The fixing element fixes the circuit board and the flexible circuit board onto the optical engine housing. The abutting element abuts against the flexible circuit board and corresponds to the second bonding region, so that the first bonding region is electrically connected to the second bonding region.

14 Claims, 4 Drawing Sheets

LIGHT SOURCE FIXING ASSEMBLY AND PROJECTION DEVICE

CROSS-REFERENCE TO RELATED APPLICATION

This application claims the priority benefit of China application no. 202210064619.3, filed on Jan. 20, 2022. The entirety of the above-mentioned patent application is hereby incorporated by reference herein and made a part of this specification.

FIELD OF THE INVENTION

The present invention relates to a fixing assembly, and more particularly to a fixing assembly of an optical element and a projection device using the fixing assembly.

BACKGROUND OF THE INVENTION

The types of light sources used in projection devices have evolved from UHP lamps, light emitting diodes (LEDs) to laser diodes (LDs) as the market demands brightness, color saturation, longevity, and non-toxic environmental protection for projection devices.

When setting the light source, a circuit board is connected to the light source to configure the light source to emit light. A flexible circuit board may be also adopted to configure the light source to emit light in the case of small space or special design. The signal transmission can reach the light source through the contact between the circuit board and the flexible circuit board. In order for the light source to achieve the effect of stably providing light, it is necessary to stabilize the contact between the circuit board and the flexible circuit board during assembly to avoid the problem of poor contact.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The disclosure provides a light source fixing assembly, which is used for improving the effect of circuit conduction, improving the assembly process and reducing the cost.

The disclosure provides a projection device, which can improve the effect of circuit conduction, improve the assembly process and reduce the cost.

Other advantages and objects of the invention may be further illustrated by the technical features broadly embodied and described as follows.

In order to achieve one or a portion of or all of the objects or other objects, an embodiment of the disclosure provides a light source fixing assembly applied to a projection device. The light source fixing assembly includes an optical engine housing, a circuit board, a light emitting element, a flexible circuit board, a fixing element and an abutting element. The optical engine housing has an outer surface. The circuit board has a bearing surface, a first fixing region and a first bonding region which is conductive. The bearing surface faces the outer surface of the optical engine housing. The first bonding region is on the bearing surface. The light emitting element is disposed on the bearing surface of the circuit board. A light emitting surface of the light emitting element faces an interior of the optical engine housing. The flexible circuit board is disposed between the optical engine housing and the circuit board. The flexible circuit board has a first surface, a second surface opposite to the first surface, and a second fixing region. The first surface faces the outer surface of the optical engine housing. The second surface faces the bearing surface of the circuit board. The second surface has a second bonding region which is conductive. The second bonding region corresponds to the first bonding region. The fixing element is disposed to pass through the first fixing region and the second fixing region in sequence and fix the circuit board and the flexible circuit board onto the outer surface of the optical engine housing. The abutting element abuts against the flexible circuit board and corresponds to the second bonding region, so that the first bonding region of the circuit board is electrically connected to the second bonding region of the flexible circuit board. An orthographic projection of the abutting element on the second surface does not overlap with the second fixing region.

In an embodiment of the disclosure, a first end of the abutting element is fixed to the second bonding region, and a second end of the abutting element abuts against the first bonding region.

In an embodiment of the disclosure, the flexible circuit board further has a buffer hole extending from the first surface to the second surface.

In an embodiment of the disclosure, the outer surface of the optical engine housing has a groove corresponding to the second bonding region, and an area of an opening of the groove is greater than or equal to an area of an orthographic projection of an elastic piece on the opening.

In an embodiment of the disclosure, the abutting element is disposed on the outer surface of the optical engine housing. The abutting element includes a protruding post extending outward from the outer surface, and the protruding post abuts against the first surface, so that the first bonding region is superimposed on the second bonding region.

In an embodiment of the disclosure, the abutting element is disposed on the outer surface of the optical engine housing. The abutting element includes a spring positioning post, the outer surface has a positioning hole, the spring positioning post is located in the positioning hole, and a top end of the spring positioning post abuts against the first surface, so that the first bonding region is superimposed on the second bonding region.

In an embodiment of the disclosure, the abutting element is disposed on the outer surface of the optical engine housing. The abutting element includes an elastic piece, the outer surface has a groove, the elastic piece is fixed in the groove, and the elastic piece abuts against the first surface, so that the first bonding region is superimposed on the second bonding region.

In an embodiment of the disclosure, a bottom surface of the groove has an engaging portion. A first end of the elastic piece is engaged with the engaging portion, and a second end of the elastic piece abuts against the first surface.

In an embodiment of the disclosure, the abutting element is disposed on the outer surface of the optical engine housing. The abutting element includes at least two of a protruding post extending outward from the outer surface, a spring positioning post and an elastic piece, so that the first bonding region is superimposed on the second bonding region.

In an embodiment of the disclosure, the fixing element is a screw. The first fixing region and the second fixing region each include a through hole. The outer surface of the optical engine housing has a screw hole, and the screw passes through the through holes and is fastened to the screw hole.

In an embodiment of the disclosure, the aforementioned light source fixing assembly further includes a heat dissipation block and a flexible heat dissipation sheet. The heat dissipation block is disposed on one side of the circuit board facing away from the optical engine housing. The flexible heat dissipation sheet is disposed between the heat dissipation block and the circuit board.

In an embodiment of the disclosure, the outer surface of the optical engine housing has a through hole. The light emitting surface of the light emitting element faces the interior of the optical engine housing through the through hole of the optical engine housing when the circuit board and the flexible circuit board are fixed on the outer surface.

In an embodiment of the disclosure, an area of the first bonding region is substantially equal to an area of the second bonding region.

In order to achieve one or a portion of or all of the objects or other objects, an embodiment of the disclosure provides a projection device, which includes an optical engine module and a projection lens. The optical engine module includes the aforementioned light source fixing assembly and a light valve. The light valve is disposed in the optical engine housing and is configured to provide an image beam. The projection lens is connected to the optical engine housing, located on a transmission path of the image beam, and configured to project the image beam out of the projection device.

In the light source fixing assembly of the embodiment of the disclosure, the abutting element abuts against the flexible circuit board and corresponds to the second bonding region, so that the first bonding region of the circuit board is electrically connected to the second bonding region of the flexible circuit board. In addition, by using the fixing element to fix the circuit board and the flexible circuit board onto the outer surface of the optical engine housing, a poor contact between the circuit board and the flexible circuit board caused by the deformation or dislocation of the abutting element does not easily happen when the abutting element conducts the circuit board and the flexible circuit board, and therefore the effect of circuit conduction between the circuit board and the flexible circuit board can be improved. Moreover, because the orthographic projection of the abutting element on the second surface does not overlap with the second fixing region, that is, the fixing element and the abutting element with different functions are disposed separately, the embodiment of the disclosure can improve the assembly process of the light source fixing assembly and make the assembly process smoother. When one of the fixing element and the abutting element needs to be replaced, the configuration of the other component will not be affected, and therefore the manufacturing cost of the light source fixing assembly can be reduced.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
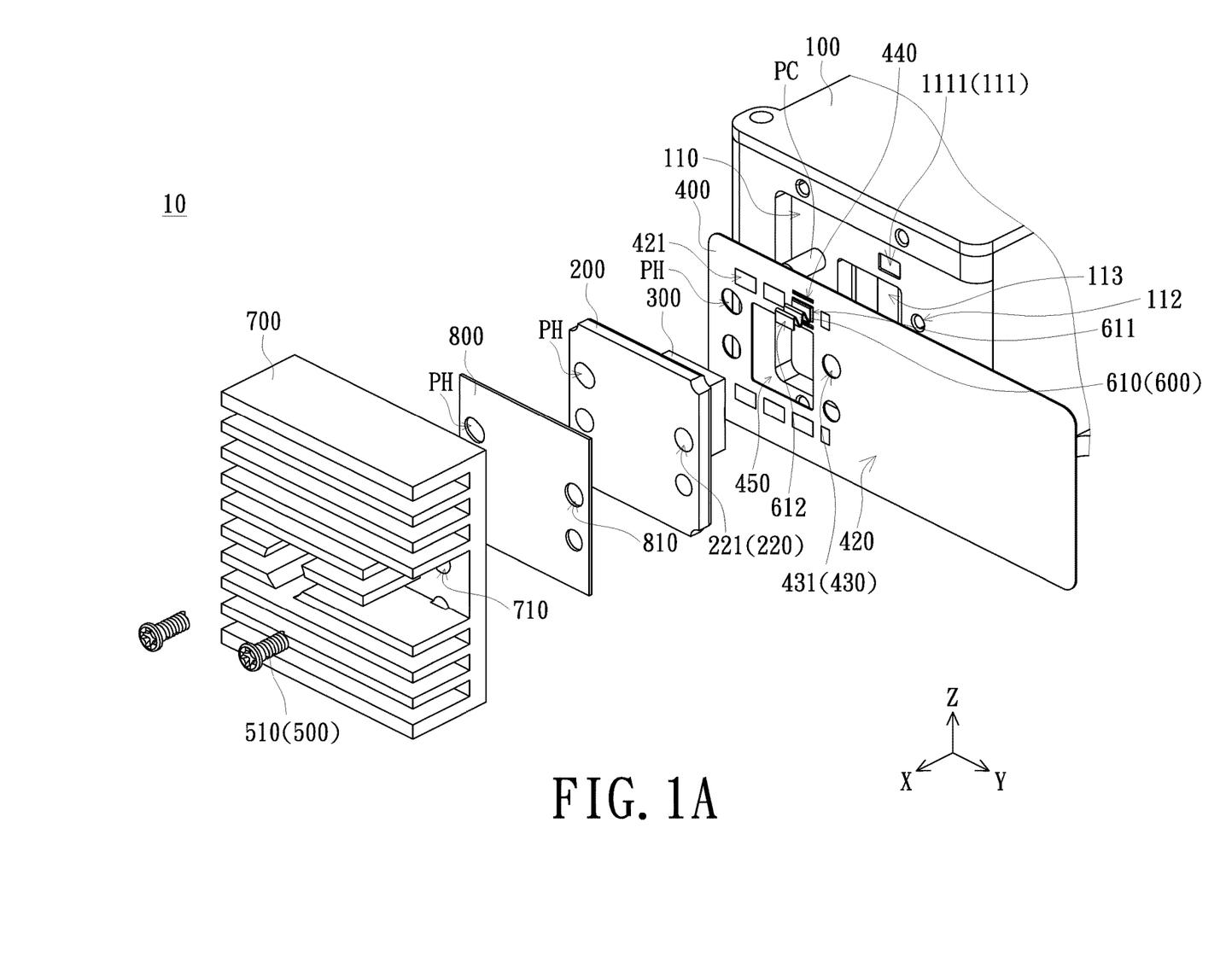
FIG. 1A is a schematic exploded diagram of a light source fixing assembly viewed from a specific viewing angle according to an embodiment of the disclosure.
Figure 1B:
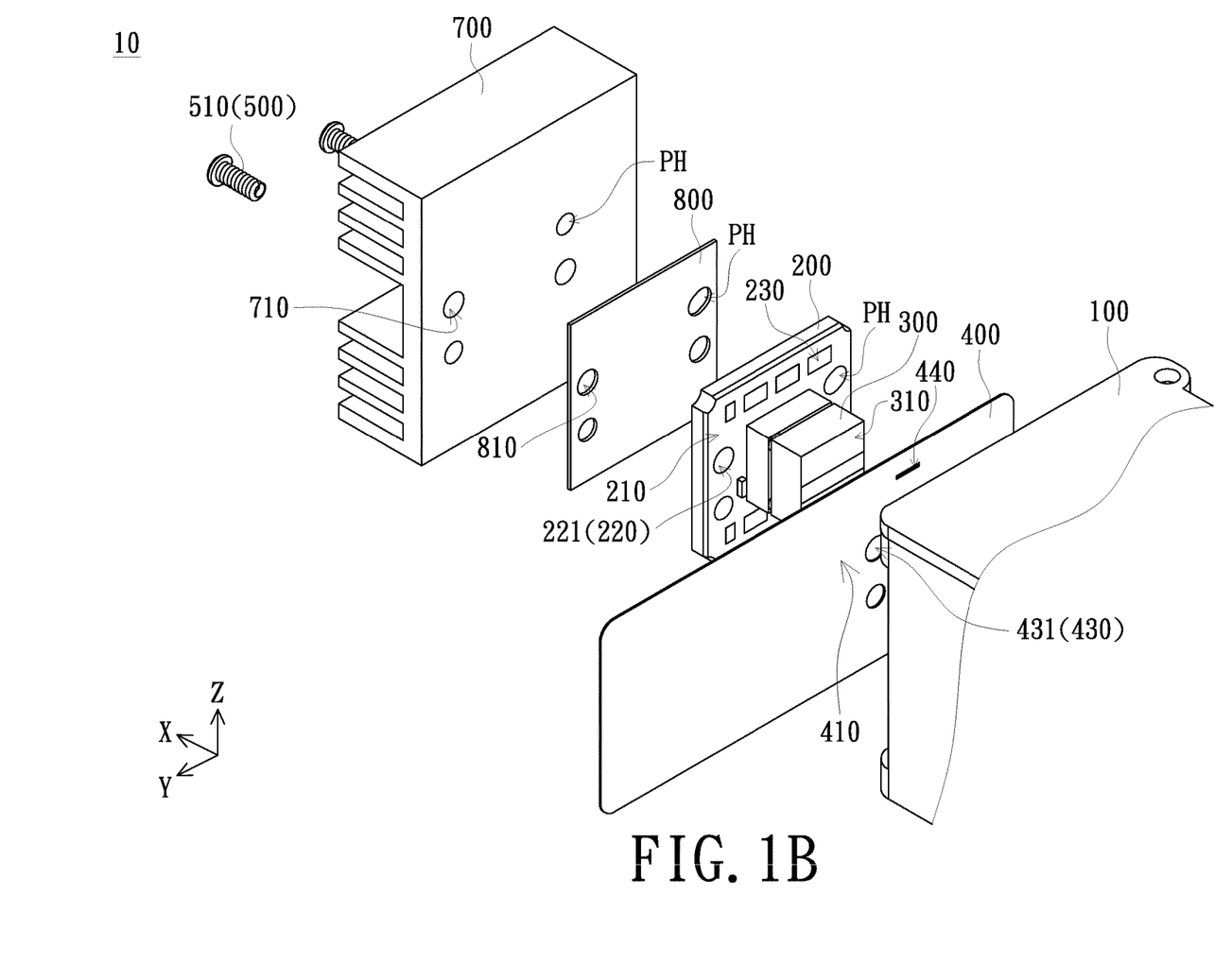
FIG. 1B is a schematic exploded diagram of a light source fixing assembly viewed from another specific viewing angle according to an embodiment of the disclosure.

FIG. 1A is a schematic exploded diagram of a light source fixing assembly viewed from a specific viewing angle according to an embodiment of the disclosure. FIG. 1B is a schematic exploded diagram of a light source fixing assembly viewed from another specific viewing angle according to an embodiment of the disclosure. Please refer to FIGS. 1A and 1B. The light source fixing assembly 10 of this embodiment is applied, for example, to a projection device. The light source fixing assembly 10 includes an optical engine housing 100, a circuit board 200, a light emitting element 300, a flexible circuit board 400, a fixing element 500 and an abutting element 600. The optical engine housing 100 has an outer surface 110. In order to clearly mark all the elements, only a part of the optical engine housing 100 is shown in FIGS. 1A and 1B.

As shown in FIG. 1B, the circuit board 200 has a bearing surface 210, a first fixing region 220, and a first bonding region 230 which is conductive. The bearing surface 210 faces the outer surface 110 (shown in FIG. 1A) of the optical engine housing 100. The first bonding region 230 is on the bearing surface 210. The light emitting element 300 is disposed on the bearing surface 210 of the circuit board 200 and is electrically connected to the circuit board 200. A light emitting surface 310 of the light emitting element 300 faces the interior of the optical engine housing 100. Specifically, the first bonding region 230 does not overlap with the position where the light emitting element 300 is disposed on the bearing surface 210.

As shown in FIG. 1A, the X-axis direction is the assembly direction of the light source fixing assembly 10. In the assembly direction, the flexible circuit board 400 is disposed between the optical engine housing 100 and the circuit board 200. The flexible circuit board 400 has a first surface 410 (shown in FIG. 1B), a second surface 420 opposite to the first surface 410, and a second fixing region 430. The first surface 410 faces the outer surface 110 of the optical engine housing 100. The second surface 420 faces the bearing surface 210 of the circuit board 200. The second surface 420 has a second bonding region 421 which is conductive. The second bonding region 421 of the flexible circuit board 400 corresponds to the first bonding region 230 of the circuit board 200. The shape of the first bonding region 230 is, for example, a rectangle, but this embodiment does not specifically limit the shape of the first bonding region 230. The shape of the second bonding region 421 corresponds, for example, to the shape of the first bonding region 230.

In this embodiment, the numbers of the first bonding regions 230 of the circuit board 200 and the second bonding regions 421 of the flexible circuit board 400 are plural. For example, the number of the second bonding regions 421 shown in FIGS. 1A and 1B is eight. However, the number of the second bonding region 421 may be one in other embodiments. This embodiment does not specifically limit the numbers of the first bonding regions 230 and the second bonding regions 421. It should be noted that the number of the first bonding regions 230 is equal to the number of the second bonding regions 421, thereby achieving better circuit conduction effect. In addition, in a preferred embodiment, the area of the first bonding region 230 is substantially equal to the area of the second bonding region 421. When the numbers of the first bonding regions 230 and the second bonding regions 421 are plural, the areas of the first bonding regions 230 may be equal or different from each other, and the shape and area of each second bonding region 421 correspond to the shape and area of each respective first bonding region 230. Specifically, the first bonding region 230 and the second bonding region 421 include a conductive layer (not shown in the figure), and the material used for the conductive layer is a conductive metal, such as copper. The rest of the flexible circuit board 400 (the part except the second bonding region 421) includes an insulating layer (not shown in the figure), and the material used for the insulating layer is, for example, any insulating material.

The fixing element 500 is disposed to sequentially pass through the first fixing region 220 of the circuit board 200 and the second fixing region 430 of the flexible circuit board 400 in the assembly direction and fixes the circuit board 200 and the flexible circuit board 400 onto the outer surface 110 of the optical engine housing 100. The abutting element 600 abuts against the flexible circuit board 400 and corresponds to the second bonding region 421, so that the first bonding region 230 of the circuit board 200 is electrically connected to the second bonding region 421 of the flexible circuit board 400.

The number of the abutting elements 600 in FIG. 1A is only an example to illustrate the configuration relationship of the abutting elements 600. Specifically, the number of the abutting elements 600 is also equal to the numbers of the first bonding regions 230 and the second bonding regions 421. Hereinafter, the detailed structure and implementation of the light source fixing assembly 10 shown in FIGS. 1A and 1B will be further described.

In this embodiment, the abutting element 600 is, for example, disposed between the circuit board 200 and the flexible circuit board 400 in the assembly direction. In other embodiments, the abutting element 600 may be disposed between the flexible circuit board 400 and the optical engine housing 100. The abutting element 600 includes, for example, a protruding post, a spring positioning post and an elastic piece. In this embodiment, the abutting element 600 is an element with compressible and conductive properties, such as an elastic piece 610. As shown in FIG. 1A, in order to prevent the elastic piece 610 from falling off during the assembly process, one end 611 of the elastic piece 610 is fixed to the second bonding region 421 of the flexible circuit board 400, and the other end 612 of the elastic piece 610 abuts against the first bonding region 230 of the circuit board 200. Therefore, a circuit can be stably conducted between the first bonding region 230 and the second bonding region 421 by the arrangement of the elastic piece 610. However, the compressed elastic piece 610 still has a certain volume, and the elastic piece 610 generates a pushing force on the circuit board 200 and a reverse force on the flexible circuit board 400 when the elastic piece 610 is compressed. The reverse force of the elastic piece 610 may deform or break the flexible circuit board 400 due to the material properties of the flexible circuit board 400. Therefore, in this embodiment, the flexible circuit board 400 may further have, for example, a buffer hole 440 extending from the first surface 410 (shown in FIG. 1B) to the second surface 420. The buffer hole 440 is disposed beside the second bonding region 421 fixed with the elastic piece 610. In one embodiment as shown in FIG. 1A, the buffer holes 440 are disposed on the upper and lower sides of the second bonding region 421 in the Z-axis direction. In other embodiments, the number and arrangement positions of the buffer holes 440 can be adjusted according to design requirements. The shape of the buffer hole 440 in FIGS. 1A and 1B is a rectangle as an example, but this embodiment does not particularly limit the area and shape of the buffer hole 440. The buffer hole 440 is configured to reduce the diffusion of the reverse force of the elastic piece 610 to the periphery of the flexible circuit board 400, that is, to reduce the deformation or breakage of the flexible circuit board 400.

In addition, in order to further enhance the above effects, the outer surface 110 of the optical engine housing 100 may further include a groove 111, and the groove 111 corresponds to the second bonding regions 421 fixed with the elastic piece 610. When the elastic piece 610 is compressed, the reverse force of the elastic piece 610 acts on the flexible circuit board 400, so that the flexible circuit board 400 is pushed in a direction toward the outer surface 110 of the optical engine housing 100 (negative X-axis direction) and a region of the first surface 410 corresponding to the second bonding region 421 will be pushed into the groove 111. The groove 111 is configured as a buffer for the reverse force of the elastic piece 610 and can also reduce the diffusion of the reverse force of the elastic piece 610 to the periphery of the flexible circuit board 400, that is, to reduce the deformation or breakage of the flexible circuit board 400. In order to fully buffer the reverse force of the elastic piece 610, the area of the opening 1111 of the groove 111 is preferably, for example, greater than or equal to the area of the orthographic projection of the elastic piece 610 on the opening 1111. In other embodiments, the area of the opening 1111 of the groove 111 is preferably greater than or equal to the area of the second bonding region 421, so that the part of the flexible circuit board 400 corresponding to the second bonding region 421 can sink into the groove 111 of the optical engine housing 100.

In this embodiment, the fixing element 500 is any element that can fix the circuit board 200 and the flexible circuit board 400 onto the optical engine housing 100. In this embodiment, the fixing element 500 is embodied as a screw 510. The first fixing region 220 of the circuit board 200 includes a first through hole 221, the second fixing region 430 of the flexible circuit board 400 includes a second through hole 431, and the outer surface 110 of the optical engine housing 100 further has screw holes 112. In the assembly direction, the screw 510 passes through the first through hole 221 and the second through hole 431 and is fastened to the screw hole 112 to fix the circuit board 200 and the flexible circuit board 400 onto the outer surface 110 of the optical engine housing 100. The number of the screws 510 in FIGS. 1A and 1B is two as an example, but the disclosure does not particularly limit the number of the fixing elements 500, as long as the fixing function can be achieved. In addition, the numbers of the first through holes 221, the second through holes 431 and the screw holes 112 correspond to the number of the screws 510. It should be noted that because the orthographic projection of the elastic piece 610 on the second surface 420 of the flexible circuit board 400 does not overlap with the second through hole 431, that is, the screw 510 and the elastic piece 610 with two different functions are disposed separately, this embodiment can improve the assembly process of the light source fixing assembly 10 and make the assembly process more smooth. When one of the screw 510 and the elastic piece 610 needs to be replaced, the configuration of the other component will not be affected, and therefore the manufacturing cost of the light source fixing assembly 10 can be reduced.

In this embodiment, the light emitting element 300 is configured to provide a beam. The light emitting element 300 is, for example, an excitation light source, and the excitation light source may be, for example, a diode module including at least one light emitting diode (LED) or laser diode (LD) chip, wherein the at least one light emitting diode or laser diode can be arranged in a matrix. In this embodiment, the beam provided by the light emitting element 300 is embodied as an excitation beam.

In this embodiment, the flexible circuit board 400 further has a third through hole 450, and the outer surface 110 of the optical engine housing 100 further has a fourth through hole 113, for example. The shapes of the third through hole 450 and the fourth through hole 113 correspond to the shape of the light emitting surface 310 (shown in FIG. 1B) of the light emitting element 300. When the circuit board 200 and the flexible circuit board 400 are fixed on the outer surface 110 of the optical engine housing 100, the light emitting surface 310 of the light emitting element 300 faces an interior of the optical engine housing 100 through the third through hole 450 of the flexible circuit board 400 and the fourth through hole 113 of the optical engine housing 100, so that the light emitting element 300 emits the excitation beam towards the inside of the optical engine housing 100. In other embodiments, the areas of the third through hole 450 and the fourth through hole 113 are greater than or equal to the area of the light emitting surface 310 of the light emitting element 300. After the light emitting element 300 passes through the third through hole 450 and the fourth through hole 113, the bearing surface 210 of the circuit board 200 can abut against the abutting element 600 or the second surface 420 of the flexible circuit board 400.

In this embodiment, because heat may be generated when the light emitting element 300 emits the excitation beam, the light source fixing assembly 10 may further include, for example, a heat dissipation element (not shown). In this embodiment, the heat dissipation element is embodied as a heat dissipation block 700 and a flexible heat dissipation sheet 800. In the X-axis direction, the heat dissipation block 700 is disposed on the side of the circuit board 200 facing away from the optical engine housing 100, and the flexible heat dissipation sheet 800 is disposed between the heat dissipation block 700 and the circuit board 200. In addition, the heat dissipation block 700 has a fifth through hole 710, and the flexible heat dissipation sheet 800 has a sixth through hole 810. The screw 510 of the fixing element 500 also passes through the fifth through hole 710 and the sixth through hole 810 in the assembly direction and is fastened to the screw hole 112 on the outer surface 110 of the optical engine housing 100, so as to fix the heat dissipation block 700 and the flexible heat dissipation sheet 800 onto the outer surface 110 of the optical engine housing 100. The flexible heat dissipation sheet 800 has a compressible property. In order to avoid the damage to the flexible circuit board 400 caused by the flexible heat dissipation sheet 700 being squeezed in the negative X-axis direction during the fixing process, the configuration of the flexible heat dissipation sheet 800 is used as a buffer between the heat dissipation block 700 and the circuit board 200/the flexible circuit board 400.

In addition to the fixing function of the fixing element 500, the outer surface 110 of the optical engine housing 100 further has, for example, at least one positioning post PC, and the circuit board 200, the flexible circuit board 400, the heat dissipation block 700 and the flexible heat dissipation sheet 800 each further, for example, have at least one positioning through hole PH, so as to ensure that each element in the light source fixing assembly 10 has a certain position and reduce the possibility of displacement of each element in this embodiment. When the fixing element 500 sequentially fixes the heat dissipation block 700, the flexible heat dissipation sheet 800, the circuit board 200 and the flexible circuit board 400 onto the outer surface 110 of the optical engine housing 100, the at least one positioning post PC passes through the positioning through holes PH of the flexible circuit board 400, the circuit board 200, the flexible heat dissipation sheet 800 and the heat dissipation block 700 in sequence, thereby reducing the possibility of displacement of these components. In another embodiment, the light source fixing assembly 10 may not be provided with the positioning post PC and the positioning hole PH according to different design requirements.

In the light source fixing assembly 10 of this embodiment, the abutting element 600 abuts against the flexible circuit board 400 and corresponds to the second bonding region 421, so that the first bonding region 230 of the circuit board 200 is electrically connected to the second bonding region 421 of the flexible circuit board 400. In addition, by using the fixing element 500 to fix the circuit board 200 and the flexible circuit board 400 onto the outer surface 110 of the optical engine housing 100, when the abutting element 600 conducts the circuit board 200 and the flexible circuit board 400, a poor contact between the circuit board and the flexible circuit board caused by the deformation or dislocation of the abutting element 600 does not easily happen, and therefore the effect of circuit conduction between the circuit board 200 and the flexible circuit board 400 can be improved. Moreover, because the orthographic projection of the abutting element 600 on the second surface 420 does not overlap with the second fixing region 430, that is, the fixing element 500 and the abutting element 600 with different functions are disposed separately, this embodiment can improve the assembly process of the light source fixing assembly 10 and make the assembly process more smooth. When one of the fixing element 500 and the abutting element 600 needs to be replaced, the configuration of the other component will not be affected, and therefore the manufacturing cost of the light source fixing assembly 10 can be reduced.

Figure 2:
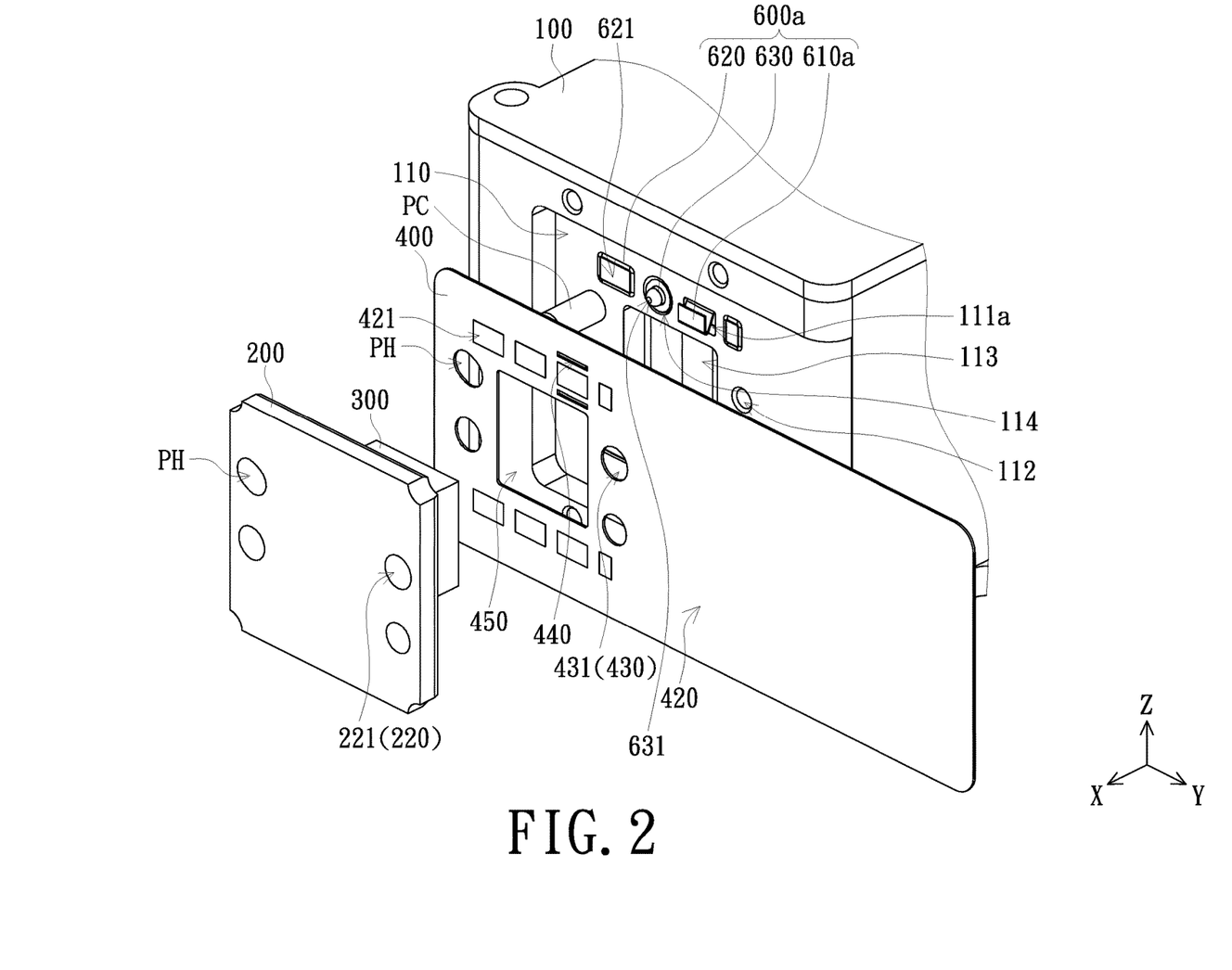
FIG. 2 is a schematic diagram of an abutting element according to another embodiment of the disclosure.

FIG. 2 is a schematic diagram of an abutting element according to another embodiment of the disclosure. Referring to FIGS. 1A and 2, the abutting element 600a of this embodiment is similar in structure and advantages to the abutting element 600 (elastic piece 610) in FIG. 1A, and only the main differences in structure are described below. The abutting element 600a of this embodiment is, for example, disposed on the outer surface 110 of the optical engine housing 100, and the abutting element 600a may include the following different forms of embodiments. First, the abutment element 600a includes, for example, a protruding post 620 extending outward from the outer surface 110 of the optical engine housing 100. That is, one end of the protruding post 620 is fixed on the outer surface 110, and the other end of the protruding post 620 abuts against the first surface 410 of the flexible circuit board 400. Specifically, the top surface 621 of the protruding post 620 abuts against the region of the first surface 410 corresponding to the second bonding region 421, so that the first bonding region 230 of the circuit board 200 is superimposed on the second bonding region 421 of the flexible circuit board 400 and in a conduction state. Preferably, the area of the top surface 621 is equal to the area of the second bonding region 421, so that the effect of the abutting element 600a abutting against the second bonding region 421 can be maximized.

In another embodiment, the abutting element 600a includes, for example, a spring positioning post 630. The outer surface 110 of the optical engine housing 100 has a positioning hole 114, and the spring positioning post 630 is located in the positioning hole 114. The spring positioning post 630 is a positioning element which is well known to those skilled in the art and is composed of a spring and a pin. The spring positioning post 630 is compressible and can abut against the flexible circuit board 400 by the pressure of the spring pushing the pin. The top end 631 of the spring positioning post 630 abuts against the first surface 410 of the flexible circuit board 400. Specifically, the top end 631 abuts against the region of the first surface 410 corresponding to the second bonding region 421, so that the first bonding region 230 of the circuit board 200 is superimposed on the second bonding region 421 of the flexible circuit board 400. The appearance shape of the top end 631 of the spring positioning post 630 can be, for example, a circle or a cylinder, and the disclosure does not specifically limit the appearance shape of the top end 631.

Figure 3:
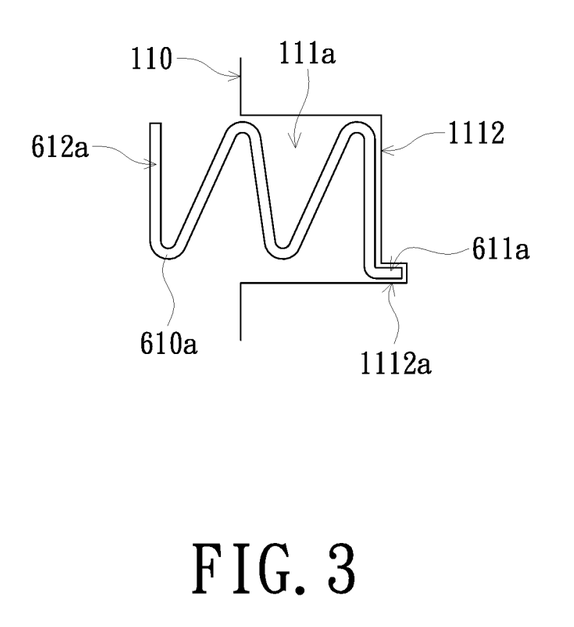
FIG. 3 is a schematic cross-sectional view of an elastic piece fixed to a groove according to an embodiment of the disclosure.

In still another embodiment, the abutting element 600a includes, for example, an elastic piece 610a. The outer surface 110 of the optical engine housing 100 has a groove 111a, and the elastic piece 610a is fixed in the groove 111a. FIG. 3 is a schematic cross-sectional view of an elastic piece fixed to a groove according to an embodiment of the disclosure. Referring to FIG. 3, the bottom surface 1112 of the groove 111a has an engaging portion 1112a. One end 611a of the elastic piece 610a is engaged with the engaging portion 1112a of the bottom surface 1112, and the other end 612a of the elastic piece 610a abuts against the first surface 410 of the flexible circuit board 400 (shown in FIG. 1B). Specifically, the other end 612a of the elastic piece 610a abuts against the region of the first surface 410 corresponding to the second bonding region 421, so that the first bonding region 230 of the circuit board 200 is superimposed on the second bonding region 421 of the flexible circuit board 400.

In other embodiments, when the number of the second bonding regions 421 of the flexible printed circuit board 400 is plural, the abutting element 600a includes, for example, at least two of the protruding post 620 extending outward from the outer surface 110, the spring positioning post 630 and the elastic piece 610a. In addition, in other embodiments, the abutting element 600 shown in FIG. 1A and the abutting element 600a shown in FIG. 2 can also cooperate with each other to apply to the light source fixing assembly 10.

Figure 4:
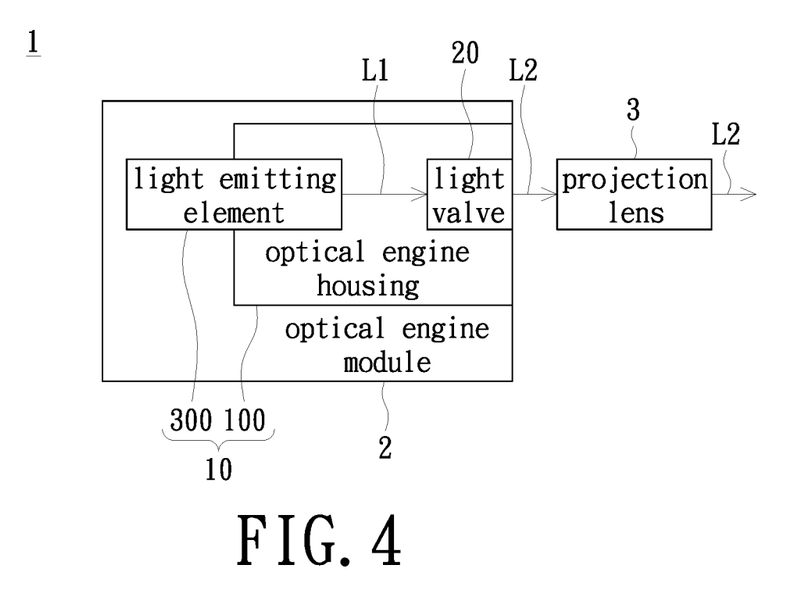
FIG. 4 is a block diagram of a projection device according to an embodiment of the disclosure.

FIG. 4 is a block diagram of a projection device according to an embodiment of the disclosure. Referring to FIG. 4, the projection device 1 of this embodiment includes an optical engine module 2 and a projection lens 3. The optical engine module 2 includes a light source fixing assembly 10 and a light valve 20. In this embodiment, the light source fixing assembly 10 used in the projection device 1 includes an optical engine housing 100, a circuit board 200, a light emitting element 300, a flexible circuit board 400, a fixing element 500 and an abutting element 600, as shown in FIG. 1A. The light emitting element 300 is configured to provide an excitation beam L1 into the optical engine housing 100. The light valve 20 is disposed in the optical engine housing 100 of the light source fixing assembly 10 and is configured to provide an image beam L2. The projection lens 3 is connected to the optical engine housing 100 and located on the transmission path of the image beam L2. The projection lens 3 is configured to project the image beam L2 out of the projection device 1 and form a projection image on the projection target. In other embodiments, the abutting element 600 of the light source fixing assembly 10 of the projection device 1 can be replaced with the abutting element 600a shown in FIG. 2.

In one embodiment, the light emitting element 300 is, for example, a diode module including a plurality of laser diode chips and is configured to provide an excitation beam L1 of various colors. The light valve 20 is located on the transmission path of the excitation beam L1 of various colors emitted from the light emitting element 300 and is configured to convert the excitation beam L1 into an image beam L2. Specifically, the diode module including a plurality of laser diode chips sequentially provides the excitation beam L1 in various color wavelength bands. In other embodiments, the optical engine module 2 of the projection device 1 may further include a wavelength conversion element (not shown in the figure), and the light emitting element 300 is, for example, an excitation light source configured to emit a blue excitation beam L1. The wavelength conversion element is disposed in the optical engine housing 100 of the light source fixing assembly 10 and is located on the transmission path of the excitation beam L1 emitted from the light emitting element 300. The wavelength conversion element can sequentially convert the excitation beam L1 in the blue wavelength band into the converted beams in other color wavelength bands (not shown in the figure). The light valve 20 is disposed on the transmission path of the excitation beam L1 and the converted beam emitted from the wavelength conversion element, and is configured to convert the excitation beam L1 and the converted beam into an image beam L2. In other embodiments, the projection device 1 can also be selectively provided with a filter element or a diffusion element according to different design requirements, but is not limited thereto.

In this embodiment, the light valve 20 may be a transmissive light valve or a reflective light valve. The transmissive light valve may be a transmissive liquid crystal panel. The reflective light valve may be a digital micro-mirror device (DMD), a liquid crystal display (LCD), a liquid crystal on silicon panel (LCoS panel), a transparent liquid crystal panel, an electro-optic modulator, a magneto-optic modulator, an acousto-optic modulator (AOM), but is not limited thereto The disclosure does not limit the type and configuration of the light valve 20. The detailed steps and implementation of the method for the light valve 20 to convert the illuminating beam L1 into the image beam L2 can be taught, suggested and implemented by common knowledge in the technical field, and thus no redundant detail is to be given herein. In this embodiment, the number of light valves 20 is one, that is, the projection device 1 uses a single digital micro-mirror element. However, the number of light valves 20 may be plural in other embodiments, and the disclosure is not limited thereto.

In this embodiment, The projection lens 3 may include, for example, a combination of one or more optical lenses with non-zero diopter, such as various combinations of non-planar lenses including biconcave lenses, biconvex lenses, meniscus lenses, convex-concave lenses, plano-convex lenses, and plano-concave lenses. In one embodiment, the projection lens 3 may also include a flat optical mirror or a curved optical mirror, so as to project the image beam L2 from the light valve 20 on a projection target. The disclosure does not limit the type and configuration of the projection lens 3.

In summary, in the light source fixing assembly of the embodiment of the disclosure, the abutting element abuts against the flexible circuit board and corresponds to the second bonding region, so that the first bonding region of the circuit board is electrically connected to the second bonding region of the flexible circuit board. In addition, by using the fixing element to fix the circuit board and the flexible circuit board onto the outer surface of the optical engine housing, a poor contact between the circuit board and the flexible circuit board caused by the deformation or dislocation of the abutting element does not easily happen when the abutting element conducts the circuit board and the flexible circuit board, and therefore the effect of circuit conduction between the circuit board and the flexible circuit board can be improved. Moreover, because the orthographic projection of the abutting element on the second surface does not overlap with the second fixing region, that is, the fixing element and the abutting element with different functions are disposed separately, the embodiment of the disclosure can improve the assembly process of the light source fixing assembly and make the assembly process smoother. When one of the fixing element and the abutting element needs to be replaced, the configuration of the other component will not be affected, and therefore the manufacturing cost of the light source fixing assembly can be reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first end, the second end, the first surface, the second surface, the first bonding region, the second bonding region, the first fixing region and the second fixing region are only used for distinguishing various elements and do not limit the number of the elements.

What is claimed is:

1. A light source fixing assembly applied to a projection device, the light source fixing assembly comprising:
an optical engine housing, having an outer surface;
a circuit board, having a bearing surface, a first fixing region and a first bonding region which is conductive, wherein the bearing surface faces the outer surface of the optical engine housing, and the first bonding region is on the bearing surface;

a light emitting element, disposed on the bearing surface of the circuit board, wherein a light emitting surface of the light emitting element faces an interior of the optical engine housing;

a flexible circuit board, disposed between the optical engine housing and the circuit board, wherein the flexible circuit board has a first surface, a second surface opposite to the first surface, and a second fixing region, the first surface faces the outer surface of the optical engine housing, the second surface faces the bearing surface of the circuit board, the second surface has a second bonding region which is conductive, and the second bonding region corresponds to the first bonding region;

a fixing element, disposed to pass through the first fixing region and the second fixing region in sequence and fix the circuit board and the flexible circuit board onto the outer surface of the optical engine housing; and an abutting element, abutting against the flexible circuit board and corresponding to the second bonding region, so that the first bonding region of the circuit board is electrically connected to the second bonding region of the flexible circuit board, wherein an orthographic projection of the abutting element on the second surface does not overlap with the second fixing region.

2. The light source fixing assembly according to claim 1, wherein a first end of the abutting element is fixed to the second bonding region, and a second end of the abutting element abuts against the first bonding region.

3. The light source fixing assembly according to claim 2, wherein the flexible circuit board further has a buffer hole extending from the first surface to the second surface.

4. The light source fixing assembly according to claim 2, wherein the outer surface of the optical engine housing has a groove corresponding to the second bonding region, and an area of an opening of the groove is greater than or equal to an area of an orthographic projection of an elastic piece on the opening.

5. The light source fixing assembly according to claim 1, wherein the abutting element is disposed on the outer surface of the optical engine housing, the abutting element comprises a protruding post extending outward from the outer surface, and the protruding post abuts against the first surface, so that the first bonding region is superimposed on the second bonding region.

6. The light source fixing assembly according to claim 1, wherein the abutting element is disposed on the outer surface of the optical engine housing, the abutting element comprises a spring positioning post, the outer surface has a positioning hole, the spring positioning post is located in the positioning hole, and a top end of the spring positioning post abuts against the first surface, so that the first bonding region is superimposed on the second bonding region.

7. The light source fixing assembly according to claim 1, wherein the abutting element is disposed on the outer surface of the optical engine housing, the abutting element comprises an elastic piece, the outer surface has a groove, the elastic piece is fixed in the groove, and the elastic piece abuts against the first surface, so that the first bonding region is superimposed on the second bonding region.

8. The light source fixing assembly according to claim 7, wherein a bottom surface of the groove has an engaging portion, a first end of the elastic piece is engaged with the engaging portion, and a second end of the elastic piece abuts against the first surface.

9. The light source fixing assembly according to claim 1, wherein the abutting element is disposed on the outer surface of the optical engine housing, the abutting element comprises at least two of a protruding post extending outward from the outer surface, a spring positioning post and an elastic piece, so that the first bonding region is superimposed on the second bonding region.

10. The light source fixing assembly according to claim 1, wherein the fixing element is a screw, the first fixing region and the second fixing region each comprise a through hole, the outer surface of the optical engine housing has a screw hole, and the screw passes through the through holes and is fastened to the screw hole.

11. The light source fixing assembly according to claim 1, further comprising a heat dissipation block and a flexible heat dissipation sheet, wherein the heat dissipation block is disposed on one side of the circuit board facing away from the optical engine housing, and the flexible heat dissipation sheet is disposed between the heat dissipation block and the circuit board.

12. The light source fixing assembly according to claim 1, wherein the outer surface of the optical engine housing has a through hole, and the light emitting surface of the light emitting element faces the interior of the optical engine housing through the through hole when the circuit board and the flexible circuit board are fixed on the outer surface.

13. The light source fixing assembly according to claim 1, wherein an area of the first bonding region is substantially equal to an area of the second bonding region.

14. A projection device, comprising an optical engine module and a projection lens, wherein the optical engine module comprises a light source fixing assembly and a light valve, the light source fixing assembly comprises an optical engine housing, a circuit board, a light emitting element, a flexible circuit board, a fixing element and an abutting element, and the light valve is disposed in the optical engine housing and is configured to provide an image beam, wherein the optical engine housing has an outer surface, the circuit board has a bearing surface, a first fixing region and a first bonding region which is conductive, the bearing surface faces the outer surface of the optical engine housing, and the first bonding region is on the bearing surface, the light emitting element is disposed on the bearing surface of the circuit board, and a light emitting surface of the light emitting element faces an interior of the optical engine housing, the flexible circuit board is disposed between the optical engine housing and the circuit board, the flexible circuit board has a first surface, a second surface opposite to the first surface, and a second fixing region, the first surface faces the outer surface of the optical engine housing, the second surface faces the bearing surface of the circuit board, the second surface has a second bonding region which is conductive, and the second bonding region corresponds to the first bonding region, the fixing element is disposed to pass through the first fixing region and the second fixing region in sequence and fix the circuit board and the flexible circuit board onto the outer surface of the optical engine housing, the abutting element abuts against the flexible circuit board and corresponds to the second bonding region, so that the first bonding region of the circuit board is electrically connected to the second bonding region of the flexible circuit board, wherein an orthographic projection of the abutting element on the second surface does not overlap with the second fixing region, and the projection lens is connected to the optical engine housing, located on a transmission path of the image beam, and configured to project the image beam out of the projection device.

* * * * *